US012496516B2

(12) United States Patent
Wang et al.

(10) Patent No.: US 12,496,516 B2
(45) Date of Patent: Dec. 16, 2025

(54) NOISE REDUCTION METHOD FOR FORCE FEEDBACK DEVICE, GAMEPAD, AND STORAGE MEDIUM

(71) Applicant: AAC Acoustic Technologies (Shanghai)Co., Ltd., Shanghai (CN)

(72) Inventors: Xiuyue Wang, Shenzhen (CN); Zhipeng Ye, Shenzhen (CN)

(73) Assignee: AAC Acoustic Technologies (Shanghai)Co., Ltd., Shanghai (CN)

( * ) Notice: Subject to any disclaimer, the term of this patent is extended or adjusted under 35 U.S.C. 154(b) by 327 days.

(21) Appl. No.: 18/091,323

(22) Filed: Dec. 29, 2022

(65) Prior Publication Data

US 2024/0100419 A1 Mar. 28, 2024

Related U.S. Application Data

(63) Continuation of application No. PCT/CN2022/131309, filed on Nov. 11, 2022.

(30) Foreign Application Priority Data

Sep. 22, 2022 (CN) ........................ 202211159988.7

(51) Int. Cl.
*A63F 13/285* (2014.01)
*A63F 13/24* (2014.01)
*A63F 13/52* (2014.01)

(52) U.S. Cl.
CPC ........... *A63F 13/285* (2014.09); *A63F 13/24* (2014.09); *A63F 13/52* (2014.09)

(58) Field of Classification Search
CPC ......... A63F 13/285; A63F 13/24; A63F 13/52
See application file for complete search history.

(56) References Cited

U.S. PATENT DOCUMENTS

| | | | | |
|---|---|---|---|---|
| 2007/0249422 | A1* | 10/2007 | Podoloff | G06F 3/048 463/43 |
| 2022/0080304 | A1* | 3/2022 | Yamano | G06F 3/041 |

* cited by examiner

*Primary Examiner* — Yingchuan Zhang
(74) *Attorney, Agent, or Firm* — Wiersch Law Group

(57) ABSTRACT

The present application provide a noise reduction method for a force feedback device, a gamepad, and a storage medium. The method includes: calculating a first time required for the vibrating rod to complete the first movement before the vibrating rod performs the first movement, and controlling the vibrating rod to stop the first movement to avoid collision with the first structure after the first time has elapsed since the vibrating rod is driven to start the first movement. Through the method, the noise generated while providing the vibration sensation for the player during the gamepad use can be reduced.

6 Claims, 6 Drawing Sheets

NOISE REDUCTION METHOD FOR FORCE FEEDBACK DEVICE, GAMEPAD, AND STORAGE MEDIUM

TECHNICAL FIELD

The present application relates to the technical field of gaming machines, in particular to a noise reduction method for a force feedback device, a gamepad, and a storage medium.

BACKGROUND

A gamepad, a universal device typically adopted with a game machine, can control a game character by manipulating buttons and a joystick. With the continuous development of gamepads, gamepads having more functions are provided to a player for use, and some gamepads have a vibration function. During a game process, a vibration sensation brought to the player by the gamepad provides the player with an immersive feeling.

The vibration sensation of a gamepad is realized by adopting a force feedback device arranged therein, controlling a vibrating rod to make a reciprocating movement in response to a frequency. However, the vibrating rod easily strikes an adjacent structure below during a descending process, resulting in noise while bringing the vibration sensation to the player during the gamepad use and reducing user experience.

SUMMARY

Embodiments of the present application provide a noise reduction method for a force feedback device, a gamepad, and a storage medium, which can reduce noise generated while providing the vibration sensation for the player during the gamepad use.

In the first aspect, the embodiments of the present application provide a noise reduction method for a force feedback device, the force feedback device comprising a vibrating rod, a driving mechanism, a first structure and a second structure, the driving mechanism driving the vibrating rod to make a reciprocating movement to generate a vibration, wherein one reciprocating movement comprises a first movement and a second movement, the first movement is a movement that the vibrating rod moves from a first position to a second position, and the second movement is a movement that the vibrating rod returns to the first position from the second position, wherein the first movement is towards the first structure and the second movement is towards the second structure, the method comprising: calculating a first time required for the vibrating rod to complete the first movement before the vibrating rod performs the first movement; and controlling the vibrating rod to stop the first movement to avoid collision with the first structure after the first time has elapsed since the vibrating rod is driven to start the first movement. Through the method, the noise generated can be reduced while providing the vibration sensation for the player during the gamepad use.

In one embodiment, the step of calculating the first time required for the vibrating rod to complete the first movement comprises:

calculating the first time required for the vibrating rod to complete the first movement based on a first position information of the vibrating rod, a second position information of the vibrating rod, a driving amplitude of the driving mechanism, and a correction coefficient.

In one embodiment, the step of calculating the first time required for the vibrating rod to complete the first movement based on the first position information of the vibrating rod, the second position information of the vibrating rod, the driving amplitude of the driving mechanism, and the correction coefficient comprises: calculating the first time based on the following formula:

$$t1=K/A*(P2+1-P1);$$

wherein t1 represents the first time required for the vibrating rod to complete the first movement; P1 represents the first position information; P2 represents the second position information; A represents the driving amplitude of the driving mechanism, and K represents a current correction coefficient.

In one embodiment, a second position in the second position information is a fixed position or a non-fixed position on a moving path of the vibrating rod.

In one embodiment, if the second position is a non-fixed position on the moving path of the vibrating rod, an actual position of the second position matches a level of the vibration event;

wherein the vibration event comprises a plurality of levels.

In one embodiment, after the step of controlling the vibrating rod to stop the first movement to avoid collision with the first structure after the first time has elapsed since the vibrating rod is driven to start the first movement, the method further comprises:

calculating a second time required for the vibrating rod to perform the second movement according to a driving frequency of the driving mechanism; and controlling the vibrating rod to stop the second movement to avoid collision with the second structure after the second time has elapsed since the vibrating rod is driven to start the second movement.

In one embodiment, the step of calculating the second time required for the vibrating rod to perform the second movement according to the driving frequency of the driving mechanism comprises: calculating the second time based on the following formula:

$$t2=1/(2*F)$$

wherein t2 represents the second time required for the vibrating rod to perform the second movement, and F represents the driving frequency of the driving mechanism.

In the second aspect, the embodiments of the present application further provide a gamepad, comprising:

an acquiring module, configured to acquire a current scene information in a screen of a terminal device connected to the gamepad;

a determining module, configured to determine a target force feedback device according to a coordinate of a vibration event; and a control module, configured to calculate a first time required for the vibrating rod to complete the first movement before the vibrating rod performs the first movement, and control the vibrating rod to stop the first movement to avoid collision with the first structure after the first time has elapsed since the vibrating rod is driven to start the first movement.

In the third aspect, the embodiments of the present application further provide a gamepad, comprising: one or more force feedback devices, a processor, and a memory configured to store at least one instruction, wherein the instruction is loaded and executed by the processor to implement the noise reduction method for the force feedback device in the first aspect.

BRIEF DESCRIPTION OF THE DRAWINGS

In order to illustrate technical solutions of the embodiments of the present application or the related art more clearly, the accompanying drawings required in the embodiments or the related art will be briefly introduced below. Obviously, the accompanying drawings in the following description are only some embodiments of the present application. For those of ordinary skill in the art, other accompanying drawings may also be obtained from these accompanying drawings without creative effort.

DETAILED DESCRIPTION OF THE EMBODIMENTS

In order to make the objectives, technical solutions, and advantages of the embodiments of the present application clearer, the technical solutions in the embodiments of the present application will be described clearly and completely as follows with reference to the accompanying drawings in the embodiments of the present application. Apparently, the embodiments to be described are merely a part rather than all of the embodiments of the present application. All other embodiments obtained by those skilled in the art based on the embodiments of the present application without creative efforts shall belong to the protection scope of the present application.

Figure 1:
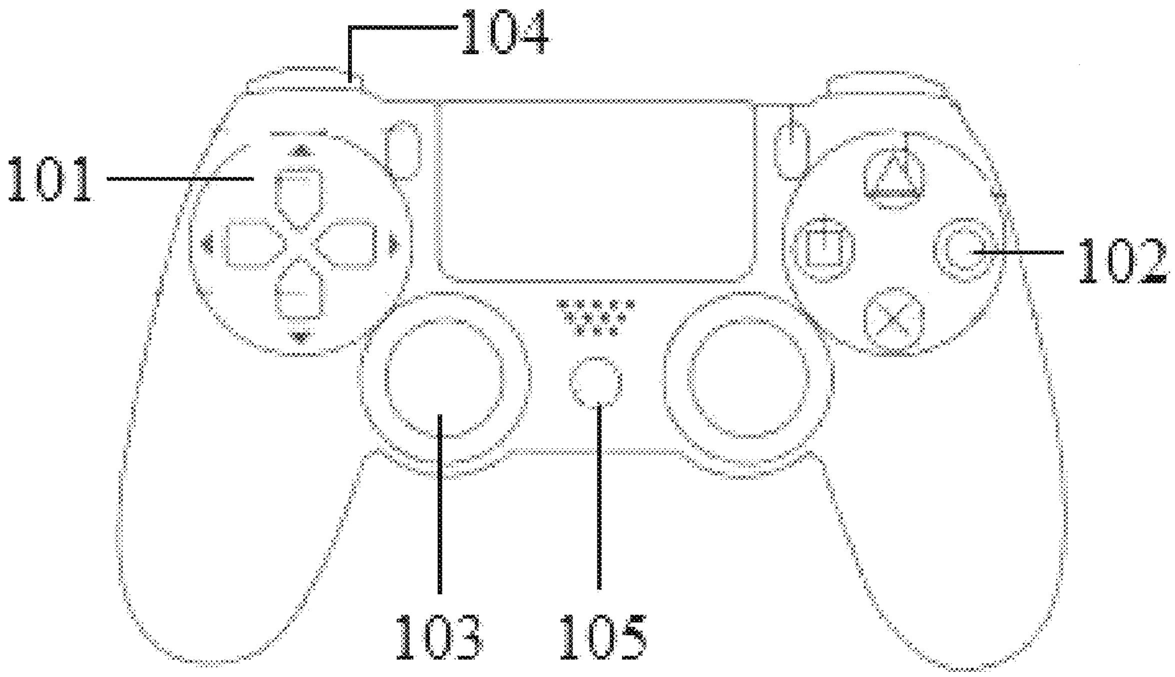
FIG. 1 is a diagram of a gamepad according to an embodiment of the present application.

FIG. 1 is a diagram of a gamepad according to an embodiment of the present application.

Referring to FIG. 1, a gamepad 100 is a component of a typical video game machine and controls a game character by manipulating buttons. A typical gamepad 100 may include buttons such as a cross button 101 (direction), an ABXY button 102 (action, and may also be marked in a different method by a hardware manufacturer, but the arrangement manner is basically the same), a rocker 103 (direction and angle of view), a trigger button 104 and a HOME menu button 105. The noise reduction method for the force feedback device provided in this embodiment does not limit the type, number, and arrangement manner of the buttons of the gamepad.

While a player is playing a game, the gamepad 100 is connected to a terminal (such as a computer, a television, or an intelligent terminal), and the game's current scene information is presented on the terminal's screen. The player manipulates buttons on the gamepad to control the display of a game picture and a virtual character in the game.

When a corresponding scene in the game includes a vibration event, the gamepad 100 is required to vibrate correspondingly to provide a vibration sensation for the player. The gamepad 100 may include a corresponding device having a vibration function. In an embodiment, the gamepad 100 may further include a force feedback device, which is configured to vibrate when the vibration event occurs in the game, to provide a corresponding vibration sensation for the player.

In one embodiment, one gamepad may include one or more force feedback devices. When the vibration event occurs in a game, the gamepad may vibrate using one or more force feedback devices, and the player may obtain game feedback information through the vibration sensation.

In a scene where a force feedback device is provided in a gamepad, when a vibration event occurs in a game, the gamepad controls the force feedback device to vibrate, and the player may obtain the game feedback information through the vibration sensation.

In a scene where at least two force feedback devices are provided in the gamepad, the gamepad vibrates via a corresponding force feedback device of the at least two force feedback devices, so that a player may obtain the game feedback information through the vibration sensation.

In an example where two force feedback devices are provided, the two force feedback devices may be arranged on two sides of the gamepad. After acquiring coordinate system information of a screen displaying a game picture, the gamepad may acquire coordinate information of a game's vibration event relative to the screen during the game, thereby determining a position at which the vibration of a force feedback device needs to be triggered. Specifically, a screen vertical midline may be adopted as a reference line, and the screen may be divided into a left half screen and a right half screen. If it is determined that the coordinates corresponding to the vibration event are distributed on the left half screen according to the acquired coordinate information about the vibration event in the game with respect to the screen, the force feedback device on the left side of the gamepad is triggered to vibrate. If it is determined that the coordinates corresponding to the vibration event are distributed on the right half screen according to the acquired coordinate information about the vibration event in the game with respect to the screen, the force feedback device on the right side of the gamepad is triggered to vibrate.

In an example where four force feedback devices (force feedback device A, force feedback device B, force feedback device C, and force feedback device D) are provided, the four force feedback devices may be arranged at four corners of the gamepad. After acquiring coordinate system information of a screen displaying a game picture, the gamepad may acquire coordinate information of a game's vibration event relative to the game's screen, thereby determining a position at which the vibration of a force feedback device needs to be triggered. Specifically, a vertical midline and a horizontal midline of the screen may be adopted as reference lines. The screen may be divided into four areas: a first area, a second area, a third area, and a fourth area. The force feedback device A corresponds to the first area of the screen. The force feedback device B corresponds to the second area of the screen. The force feedback device C corresponds to the third area of the screen. The force feedback device D corresponds to the fourth area of the screen. The area of the screen where the corresponding coordinates of the vibration events are distributed is determined according to the coordinate information of the vibration events in the game relative to the screen. For example, if the coordinate information of the vibration event in the game with respect to the screen is distributed in the first area of the screen, the force feedback device A of the gamepad is triggered to vibrate. If the coordinate information of the vibration event in the game with respect to the screen is distributed in the first region, the second region, the third region, and the fourth region, the force feedback device A, the force feedback device B, the force feedback device C and the force feedback device D of the gamepad are all triggered to vibrate.

Figure 2:
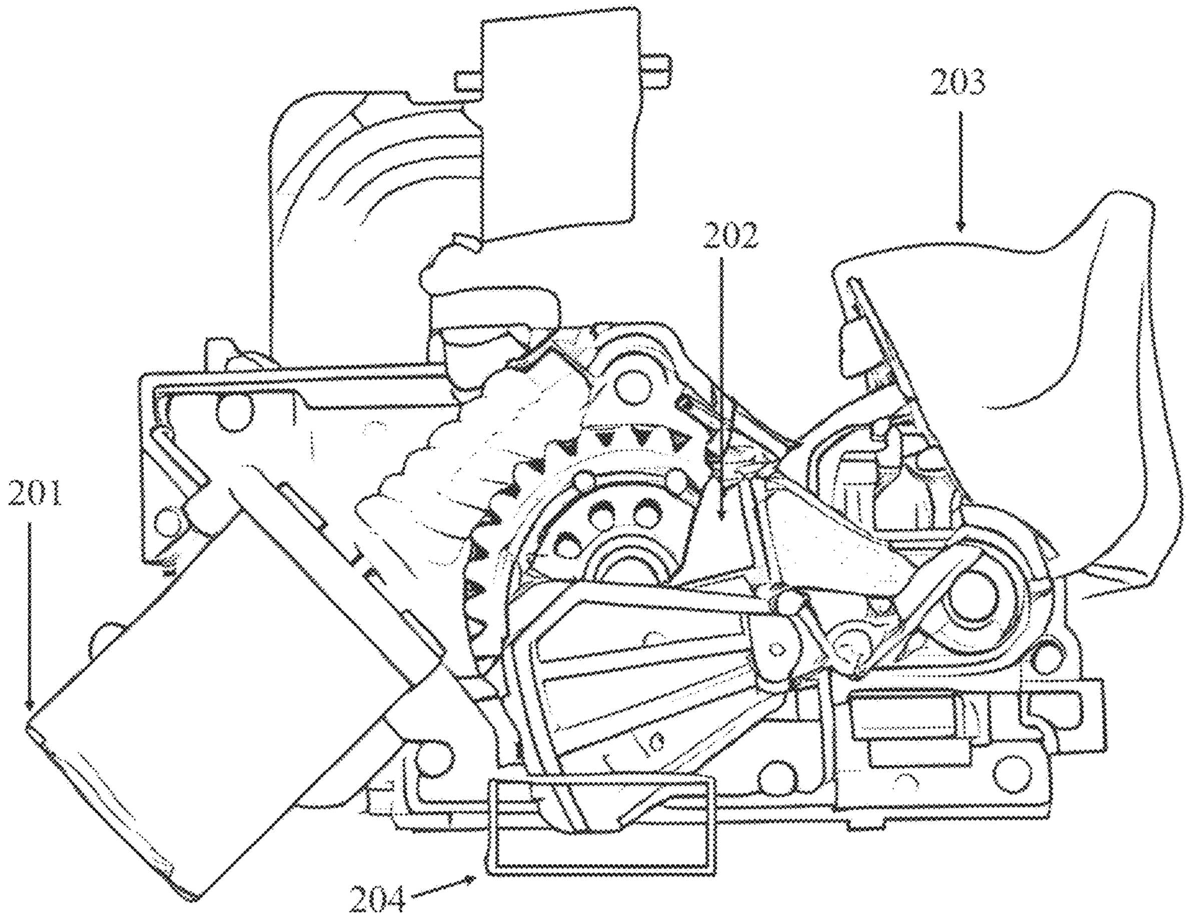
FIG. 2 is a structural diagram of a force feedback device according to another embodiment of the present application.

FIG. 2 is a structural diagram of a force feedback device according to another embodiment of the present application.

Referring to FIG. 2, the force feedback device may include a driving mechanism 201, a vibrating rod 202, and a protective cap 203. The driving mechanism 201 can drive the vibrating rod 202 to make a reciprocating movement at a set frequency. One reciprocating movement may be a process of driving the vibrating rod 201 to make a first movement from a first position (a position of the protective cap 203) to a second position (a return position), and driving, by the driving mechanism 201, the vibrating rod 202 to make a second movement and return the first position after the vibrating rod 202 reaches the second position. The first movement of the vibrating rod 201 is towards the first structure, and the second movement of the vibrating rod 202 is towards the second structure. In one embodiment, the first structure is an adjacent structure shown in FIG. 2, and the second structure is a protective cap 203 shown in FIG. 2.

In a practical application process, during a reciprocating movement of the vibrating rod 202, specifically, when the vibrating rod 202 makes the first movement, the vibrating rod 202 may impact the adjacent structure shown in FIG. 2. That is, an impact event occurs at the impact location 204, and an impact sound generated by the impact event may cause noise to be constantly generated when vibration events frequently occur on the gamepad 100, thereby affecting the game experience of the user.

In order to overcome the above-mentioned problem, the embodiments of the present application provide a noise reduction method for a force feedback device. Through the method, the probability of impact events occurring on the vibrating rod 202 may be reduced by controlling a release timing of a pushing force and a release timing of a pulling force of the driving mechanism 201, thereby reducing noise occurring when the gamepad produces the vibration sensation to the player in use.

Figure 3:
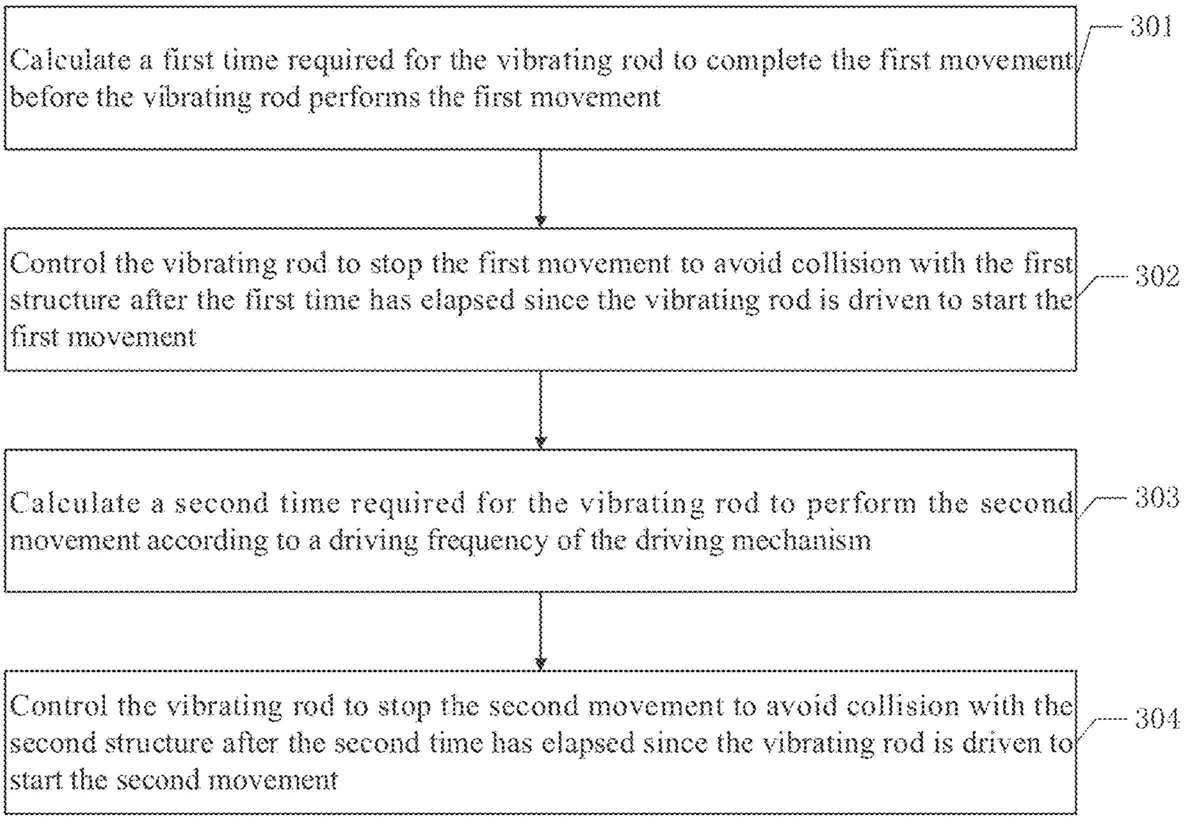
FIG. 3 is a flowchart illustrating a noise reduction method for the force feedback device according to an embodiment of the present application.

FIG. 3 is a flowchart illustrating a noise reduction method for the force feedback device according to an embodiment of the present application.

Referring to FIG. 3, the method may include the following steps.

Step 301: a first time required for the vibrating rod to complete the first movement is calculated before the vibrating rod performs the first movement.

In order to achieve the first movement of the vibrating rod 202, the driving mechanism 201 of the force feedback device provides a pushing force to the vibrating rod 202, and drives the vibrating rod 202 to move from the first position to the second position by the pushing force. In one embodiment, the shape of the vibrating rod 202 may be as shown in FIG. 2. When the driving mechanism 201 provides the pushing force to the vibrating rod 202, the vibrating rod 202 rotates around the rotation axis thereof and rotates to the second position. After the vibrating rod rotates to the second position, the driving mechanism 201 provides a pulling force to the vibrating rod 202, and drives the vibrating rod 202 to return to the first position by the pulling force, thereby controlling the vibrating rod 202 to complete the reciprocating movement. The driving mechanism 201 may drive the vibrating rod 202 to complete the reciprocating movement multiple times at a set frequency to achieve the vibration of the vibrating rod at the set frequency, thereby improving the tactile experience of the game while providing vibration sensation for a player in use.

In one embodiment, as shown in FIG. 2, the driving mechanism may be an electric motor, a driving rod of which is used in cooperation with the vibrating rod. An outer surface of the driving rod may be a thread structure, and the thread structure is cooperated with a gear structure controlling the rotation of the vibrating rod 202, i.e., the driving rod and the gear structure form a master-slave relationship (the driving rod actively controls the gear structure to rotate). When the driving rod of the motor rotates in one direction (e.g., clockwise), the driven gear structure controls the vibrating rod 202 to rotate from the first position to the second position to complete the first movement. After the vibrating rod 202 reaches the second position, the driving rod of the motor rotates in the opposite direction (e.g., counterclockwise), and the driven gear structure controls the vibrating rod 202 to reset from the second position to the first position, to complete the second movement. Thus the vibrating rod 202 completes the reciprocating movement.

In order to improve the accuracy of driving the vibrating rod 202 to the movement position, specifically, to reduce the possibility of the vibrating rod 202 striking the adjacent structure below while making the first movement, the first time required for the vibrating rod 202 to complete the first movement may be calculated before the vibrating rod 202 performs the first movement. Thus, the driving mechanism can control the releasing timing of the pushing force and the releasing timing of the pulling force of the driving mechanism 201 according to a preset time, thereby improving the accuracy of driving the vibrating rod 202 to the movement position, and reducing the possibility that the vibrating rod 202 impacts the adjacent structure below during the first movement.

In one embodiment, the first time required for the vibrating rod 202 to complete the first movement may be calculated based on the first position information and the second position information of the vibrating rod 202, the driving amplitude, and the correction coefficient 201.

Before the gamepad with a vibration function is used by a user, a driving amplitude and a driving frequency of the driving mechanism 201 in the force feedback device may be preset. In one embodiment, the driving mechanism may be an electric motor for providing force feedback. Therefore, the driving amplitude indicates the strength of the force feedback provided by the driving mechanism, i.e., the magnitude of the driving force.

Before the user uses the gamepad, the first position information and the second position information of the vibrating rod 202 during the first and second movements may also be predetermined. In one embodiment, the first position information may be the position information of the protective cap 203 shown in FIG. 2, and the second position information may be the preset position information of a return position when the vibration rod 202 reciprocates.

It should be noted that the second position may be a fixed position on a moving path of the vibrating rod 202, or may be an unfixed position on the moving path of the vibrating rod 202.

In one embodiment, if the second position is set as a fixed position on the moving path of the vibrating rod 202, when a vibration event occurs in the game, all vibration events trigger the force feedback device to vibrate to make the vibrating rod 202 reciprocate between the position of the protective cap 203 and the fixed second position, thereby providing a fixed vibration sensation to the user.

In another embodiment, if the second position is set as an unfixed position on the moving path of the vibrating rod 202, in a practical application process, when a vibration event occurs in a game, a vibration level of the current vibration event may be determined, and the actual position of the second position corresponding to the current vibration of the force feedback device may be determined according to the vibration level of the current vibration event.

The vibration events appearing in the game may be classified in advance. In one embodiment, the classification may be performed based on the type of the game scene. For example, the classification table of the vibration events is shown in Table 1 as follows.

TABLE 1

| Game Scene | Level of Vibration Event |
|---|---|
| Sports Batting Scene | First Level Vibration |
| Fighting Scene | Second Level Vibration |
| Driving Impact Scene | Third Level Vibration |
| Explosion Scene | Fourth Level Vibration |

As shown in Table 1, in this embodiment, the game scene triggering the vibration event may be divided into fourth types: sports batting scene, fighting scene, driving impact scene and explosion scene. For example, the level of the vibration event triggered when the player controls the game character to hit the tennis ball via the gamepad is the first level vibration. When the player plays a fighting game, the level of a vibration event triggered when a game character controlled by the player via the gamepad is hit is the second level vibration. The level of the vibration event triggered by the player when the vehicle impacts within the game under the control of the gamepad is the third level vibration. When a player plays a war game, the level of a vibration event triggered when an explosion occurs in a certain range of a game character or a carrier controlled by the player via the gamepad is the fourth level vibration. The vibration sensation provided to the player is enhanced from the first level vibration to fourth level vibration level by level.

The methods for classifying the level of the vibration event are not limited to the embodiments of the present application. In other embodiments, the vibration levels may also be classified based on different manners, and the number of vibration levels is also not limited.

In one embodiment, the level of each vibration event corresponds to a different second position, and the specific matching mode is shown in Table 2 as follows.

TABLE 2

| Level of Vibration Event | Second Position |
|---|---|
| First Level Vibration | Second Position A |
| Second Level Vibration | Second Position B |
| Third Level Vibration | Second Position C |
| Fourth Level Vibration | Second Position D |

As shown in Table 2, the actual location of the second location corresponding to the current vibration event is matched according to the level of the vibration event. The first level vibration corresponds to the second position A. The second level vibration corresponds to the second position B. The third level vibration corresponds to the second position C. The fourth level vibration corresponds to the second position D. Since the vibration sensation provided to the player is enhanced from first level vibration to fourth level vibration level by level, in order to achieve the level-by-level enhancement of the vibration, the actual positions of the second positions corresponding to different vibration levels may be set to be different. For example, a driving frequency of the driving mechanism 201 of the force feedback device may be fixed, and different driving amplitudes are output based on different levels of vibration events. Thus, when the actual positions of the second positions corresponding to different vibration levels are different, the vibrating rod 202 is driven to move from the first position to the second position (the second position A, the second position B, the second position C or the second position D) within the same or similar time, thereby providing different vibration sensations to the player. The moving path of the vibrating rod 202 moving from the first position to the second position A is $L_{(A)}$. The moving path of the vibrating rod 202 moving from the first position to the second position B is $L_{(B)}$. The moving path of the vibrating rod 202 moving from the first position to the second position C is $L_{(c)}$, and the moving path of the vibrating rod 202 moving from the first position to the second position D is $L_{(D)}$, and the magnitude of the moving path is increased from the moving path $L_{(A)}$ to the moving path $L_{(D)}$ increases level-by-level, that is, $L_{(A)}<L_{(B)}<L_{(c)}<L_{(D)}$.

In an embodiment, the first time required for the vibrating rod 202 to complete the first movement this time may be calculated based on the first position information and the second position information of the vibrating rod 202, the driving amplitude, and the correction coefficient 201 by using the following formula 1:

$$t1=K/A*(P2+1-P1) \quad \text{formula 1;}$$

t1 represents the first time required for the vibrating rod 202 to complete the first movement at this time. P1 represents the first position information. P2 represents the second position information. A represents the driving amplitude of the driving mechanism 201, and K represents a current suitable correction coefficient.

The first time t1 required for the vibrating rod 202 to complete the first movement this time may be calculated before the driving mechanism 201 drives the vibrating rod 202 to perform the first movement through the above-mentioned method.

Step 302: the driving mechanism controls the vibrating rod to stop the first movement after the first time since the driving mechanism drives the vibrating rod to start the first movement.

After the first time t1 required for the vibrating rod 202 to complete the first movement this time is calculated in Step 301, the driving mechanism 201 may start timing while releasing the pushing force to drive the vibrating rod 202 to start the first movement. After t1, the pushing force is stopped to be released, and the vibrating rod 202 may be controlled to stop moving after t1, thereby improving the accuracy of controlling the movement of the vibrating rod and reducing the possibility that the vibrating rod hits an adjacent structure below and causes noise to appear.

In some embodiments, when the vibrating rod 202 performs the second movement, a second time required by the vibrating rod to complete the second movement this time may also be calculated, and the vibrating rod 202 is controlled to stop the second movement based on the calculated second time, thereby reducing the possibility of noise occurring due to the vibrating rod 202 impacting the protective cap 203 and improving the user experience. Specifically, it may be realized by the following steps.

Step 303: a second time required by the vibrating rod to perform the second movement is calculated according to the driving frequency of the driving mechanism.

The driving frequency of the driving mechanism 201 may be a frequency preset by a user. For example, the set driving frequency is 2 Hz, and the second time required for the vibrating rod 202 to perform the second movement may be calculated according to the driving frequency (e.g., 2 Hz) of the driving mechanism 201.

In one embodiment, the second time required for the second movement of the vibrating rod 202 may be calculated by the following formula 2:

$$t2=1/(2*F) \quad \text{formula 2;}$$

t2 represents the second time required for the vibrating rod 202 to complete the second movement, and F represents the driving frequency of the driving mechanism 201. For example, if the driving frequency of the driving mechanism 201 is 2 Hz, the second time required for the vibrating rod 202 to perform the second movement can be calculated to be 250 ms based on the above formula 2.

The second time t2 required for the vibrating rod 202 to complete the second movement this time may be calculated before the driving mechanism 201 drives the vibrating rod 202 to perform the second movement through the above-mentioned method.

Step 304: the driving mechanism controls the vibrating rod to stop the second movement after a second time since the driving mechanism drives the vibrating rod to start the second movement.

After the second time t2 required for the vibrating rod 202 to complete the second movement this time is calculated in Step 303, the driving mechanism 201 may start timing while releasing the pulling force to drive the vibrating rod 202 to start the second movement. After the time t2, the pulling force is stopped to be released, and then the vibration rod 202 may be controlled to stop moving after the time period t2, thereby improving the accuracy of controlling the movement of the vibrating rod and reducing the possibility of noise appearing due to the vibrating rod impacting the protective cap 203.

The accuracy of driving the vibrating rod 202 can be improved at each stage of the reciprocating movement of the force feedback device, which needs to perform the reciprocating movement to achieve vibration through the described steps 301 to 304, thereby reducing the possibility of noise occurring due to the vibrating rod 202 impacting other structures, and improving the user experience.

The corresponding control module of the gamepad controls the target force feedback device to vibrate, to enrich how a player obtains tactile sensation through the gamepad, and increase the amount of acquired current scene information about the game, thereby making a judgment and response operation more quickly and accurately, and improving the game experience of the player.

Figure 4:
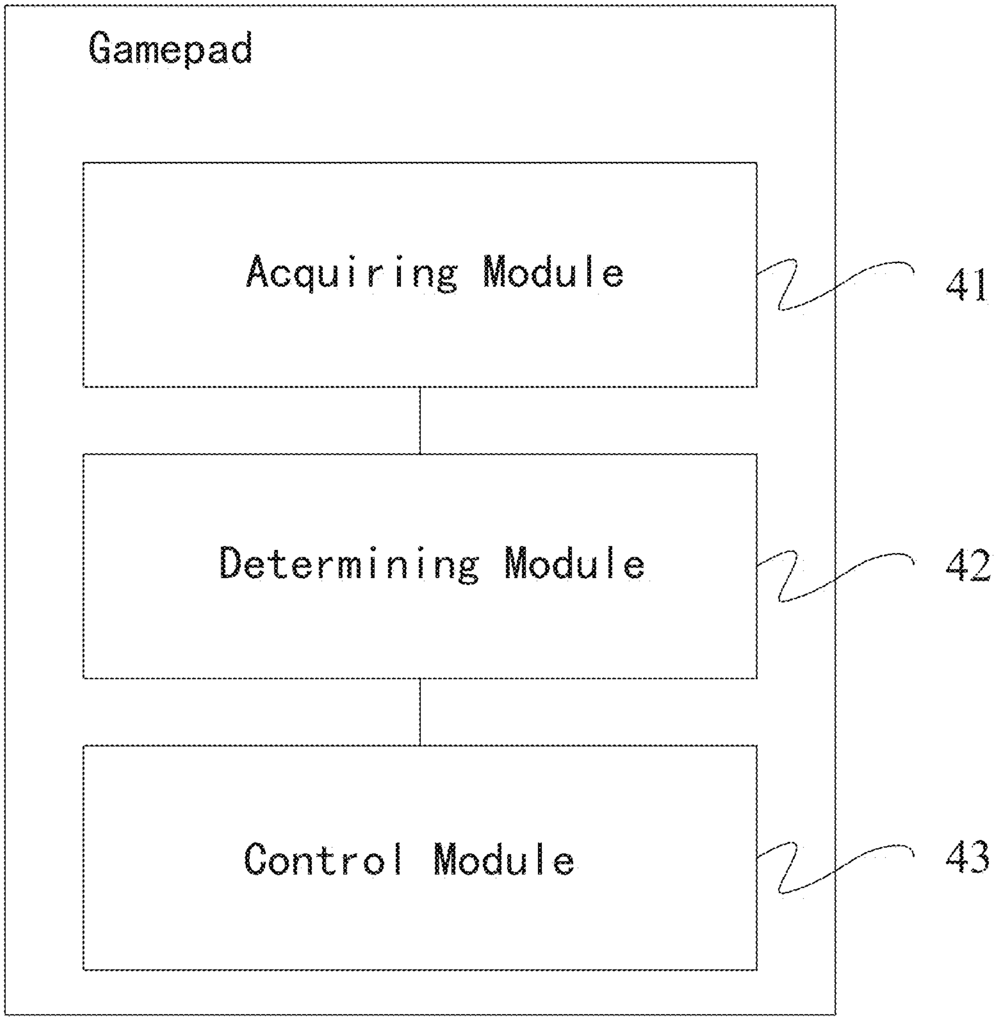
FIG. 4 is a structural diagram of the gamepad according to an embodiment of the present application.

FIG. 4 is a structural diagram of the gamepad according to an embodiment of the present application.

As shown in FIG. 4, the gamepad provided in this embodiment includes the following modules:

- an acquiring module 41 configured to acquire current scene information (game scene information) in a screen of a terminal connected to a gamepad, and further configured to acquire an event coordinate corresponding to the vibration event when the current scene information includes a vibration event;
- a determining module 42 configured to determine a target force feedback device according to the vibration event coordinate; and
- a control module 43 configured to execute the method provided in the embodiment shown in FIG. 3, calculate a first time and a second time, and control the vibration of the force feedback device corresponding to the vibration event coordinates according to the first time and the second time.

A player can determine the information represented by the vibration information of a gamepad according to the touch sense, and realizes tactile-based information transmission according to vibration conditions of different force feedback devices on the gamepad. Therefore, the player acquires game scene information according to the vibration sensation to realize accurate positioning of a game scene. During a game process, the player can promptly learn game progress and accurately respond to a competition situation. The gamepad provided in this embodiment not only serves as an input device to perform game manipulation, but also as an output device to feed back game information to a player, thereby improving the player's game experience.

Figure 5:
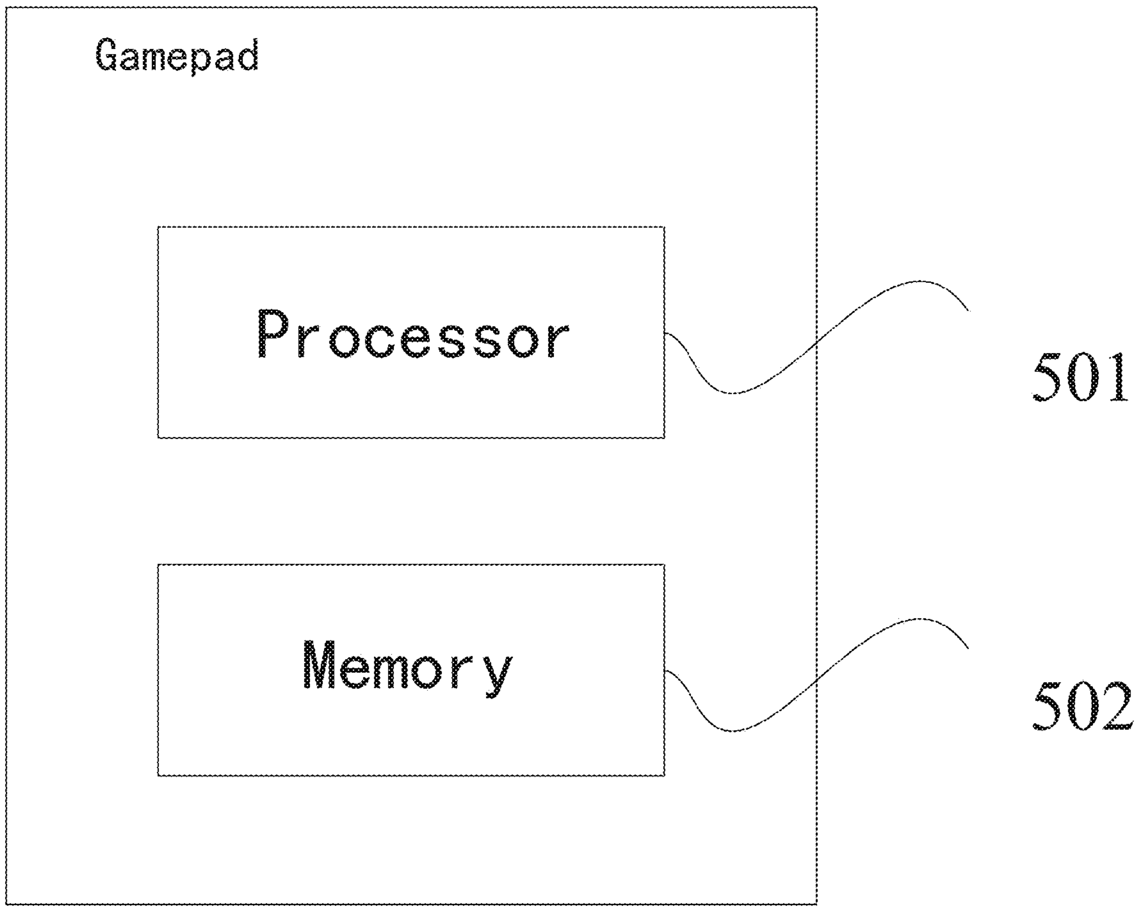
FIG. 5 is a structural diagram of the gamepad according to an embodiment of the present application.

FIG. 5 is a structural diagram of the gamepad according to an embodiment of the present application.

Referring to FIG. 5, the gamepad provided in the embodiment of the present application may include a processor 501 and a memory 502. The memory 502 is configured to store at least one instruction. The instruction is loaded and executed by the processor 501 to implement the noise reduction method for the force feedback device provided in any embodiment of the present application.

Figure 6:
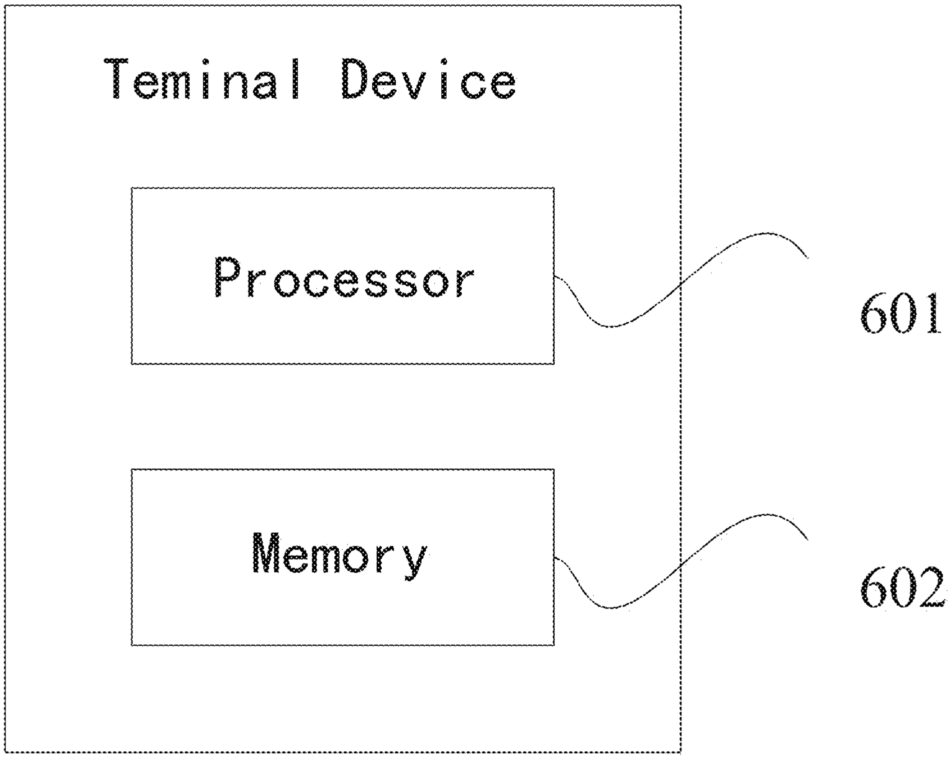
FIG. 6 is a diagram of a terminal device according to an embodiment of the present application.

FIG. 6 is a diagram of a terminal device according to an embodiment of the present application.

Referring to FIG. 6, the terminal device 60 in this embodiment includes a processor 601, a memory 602, and a computer program stored in the memory 602 and operable on the processor 601, such as a vibration program of a gamepad. When executing the computer program, the processor 60 implements the noise reduction method for the force feedback device provided in any one of the embodiments of the present application.

The terminal device 6 may be a device such as a desktop computer, a notebook computer, a handheld computer, a desktop gaming machine, and a handheld game machine. The terminal device 6 may include, but is not limited to, a processor 601 and a memory 602. Those skilled in the art may understand that FIG. 6 is only an example of the terminal device 6, and does not limit the terminal device 6. The terminal device 6 may include more or less components than those shown in the figure, or may combine some components, or may be different components. For example, the terminal device 6 may further include an input/output device, a network access device, a bus, and the like.

The embodiments of the present application further provide a computer storage medium, on which a computer program is stored. When executed by a processor, the computer program implements a noise reduction method for a force feedback apparatus provided in any embodiment of the present application.

Embodiments of the present application further provide a computer program product, including a computer program or an instruction. When the computer program or the instruction is executed by a processor, a noise reduction method for a force feedback device provided in any embodiment of the present application is implemented.

It should be noted that the terminal involved in the embodiment of the present application may include but is not limited to, a personal computer (PC), a personal digital assistant (PDA), a wireless handheld device, a tablet computer, a mobile phone, an MP3 player, and an MP4 player.

It may be understood that the application may be an application (native application) installed on a terminal, or may also be a web application of a browser on the terminal, which is not limited to the embodiment of the present application.

It may be clearly understood by those skilled in the art that, for the purpose of a convenient and brief description of a detailed working process of the foregoing system, apparatus, and unit, reference may be made to a corresponding process in the foregoing method embodiments, and details are not described herein again.

In the several embodiments provided in the present application, it should be understood that the disclosed system, device, and method may be implemented in other manners. For example, the device embodiments described above are merely exemplary. For example, the division of the units is merely logical function division and may be other division in practical implementation. For example, a plurality of units or components may be combined or integrated into another system, or some features may be ignored or not executed. In addition, the displayed or discussed mutual couplings or direct couplings, or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network elements. A part or all of the units may be selected according to practical requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in the form of hardware, or may also be implemented in the form of hardware and a software functional unit.

The integrated unit implemented in the form of a software functional unit may be stored in a computer-readable storage medium. The software functional unit is stored in a storage medium, and includes several instructions for instructing a computer device (which may be a personal computer, a server, a network apparatus, or the like) or a processor to execute a part of the steps of the methods described in the embodiments of the present application. The above-mentioned storage medium includes any medium that can store program codes, such as a USB flash disk, a removable hard disk, a read-only memory (ROM), a random access memory (RAM), a magnetic disk, or an optical disk.

Described above are merely preferred embodiments of the present application, but are not intended to limit the present application. Any modification, equivalent replacement, or improvement made within the spirit and principle of the present application shall belong to the protection scope of the present application.

Finally, it should be noted that the above-mentioned embodiments are merely intended to describe the technical solutions of the present application rather than limiting the present application. Although the present application is described in detail with reference to the above-mentioned embodiments, those of ordinary skill in the art should understand that they may still make modifications to the technical solutions described in the above-mentioned embodiments, or make equivalent replacements to some or all technical features thereof. These modifications or replacements do not make the essence of the corresponding technical solutions depart from the scope of the technical solutions of the embodiments of the present application.

What is claimed is:

1. A noise reduction method for a force feedback device, the force feedback device comprising a vibrating rod, a driving mechanism, a first structure, and a second structure, the driving mechanism driving the vibrating rod to make a reciprocating movement to generate a vibration, wherein one reciprocating movement comprises a first movement and a second movement, the first movement is a movement that the vibrating rod moves from a first position to a second position, and the second movement is a movement that the vibrating rod returns to the first position from the second position, wherein the first movement is towards the first structure and the second movement is towards the second structure, the method comprising:

calculating a first time required for the vibrating rod to complete the first movement before the vibrating rod performs the first movement; and controlling the vibrating rod to stop the first movement to avoid collision with the first structure after the first time has elapsed since the vibrating rod is driven to start the first movement;

wherein the step of calculating the first time required for the vibrating rod to complete the first movement comprises:

calculating the first time required for the vibrating rod to complete the first movement based on a first position information of the vibrating rod, a second position information of the vibrating rod, a driving amplitude of the driving mechanism, and a correction coefficient;

wherein the step of calculating the first time required for the vibrating rod to complete the first movement based on the first position information of the vibrating rod, the second position information of the vibrating rod, the driving amplitude of the driving mechanism, and the correction coefficient comprises: calculating the first time based on the following formula:

$$t1=K/A*(P2+1-P1);$$

wherein t1 represents the first time required for the vibrating rod to complete the first movement; P1 represents the first position information; P2 represents the second position information; A represents the driving amplitude of the driving mechanism, and K represents a current correction coefficient.

2. The method of claim 1, wherein a second position in the second position information is a fixed position or a non-fixed position on a moving path of the vibrating rod.

3. The method of claim 2, wherein if the second position is a non-fixed position on the moving path of the vibrating rod, an actual position of the second position matches a level of the vibration event;

wherein the vibration event comprises a plurality of levels.

4. The method of claim 1, wherein after the step of controlling the vibrating rod to stop the first movement to avoid collision with the first structure after the first time has elapsed since the vibrating rod is driven to start the first movement, the method further comprises:

calculating a second time required for the vibrating rod to perform the second movement according to a driving frequency of the driving mechanism; and controlling the vibrating rod to stop the second movement to avoid collision with the second structure after the second time has elapsed since the vibrating rod is driven to start the second movement.

5. The method of claim 4, wherein the step of calculating the second time required for the vibrating rod to perform the second movement according to the driving frequency of the driving mechanism comprises: calculating the second time based on the following formula:

$$t2=1/(2*F)$$

wherein t2 represents the second time required for the vibrating rod to perform the second movement, and F represents the driving frequency of the driving mechanism.

6. A gamepad, comprising:

one or more force feedback devices;

a processor; and a memory, configured to store at least one instruction;

wherein the instruction is loaded and executed by the processor to implement the noise reduction method for the force feedback device of claim 1.

* * * * *